United States Patent [19]
Avis

[11] 3,780,511
[45] Dec. 25, 1973

[54] TRASH SEPARATOR FOR CROP PICK-UP HARVESTER

[75] Inventor: John M. Avis, Spring Lake, Mich.

[73] Assignee: Koehring Company, Milwaukee, Wis.

[22] Filed: Sept. 15, 1972

[21] Appl. No.: 289,671

Related U.S. Application Data

[62] Division of Ser. No. 172,623, Aug. 18, 1971, Pat. No. 3,712,039.

[52] U.S. Cl............... 56/364, 171/28, 171/133, 130/30 R
[51] Int. Cl............................................. A01d 89/00
[58] Field of Search...................... 171/28, 133; 56/DIG. 1, 364; 130/30 R, 30 G

[56] References Cited
UNITED STATES PATENTS

| | | | |
|---|---|---|---|
| 3,597,909 | 8/1971 | Lauridsen et al. | 171/28 |
| 2,531,379 | 11/1950 | Chickering | 171/133 |
| 2,588,764 | 3/1952 | Richmond | 171/28 |
| 2,953,209 | 9/1960 | DeMarco | 56/DIG. 1 |
| 3,513,645 | 5/1970 | Garrett et al. | 56/DIG. 1 |
| 3,238,950 | 3/1966 | Taylor | 56/DIG. 1 |

Primary Examiner—Antonio F. Guida
Attorney—Andrew J. Beck

[57] ABSTRACT

A trash separator for a mobile harvester for picking up fruit such as apples, oranges, nuts or vegetables for example, lying on the ground, which separator acts to separate trash from the crop and which additionally acts to clean the crop before discharging it into storage bins or the like. The separator includes pairs of oppositely rotating rollers which pull the foreign material downwardly through the nip formed between the pairs of rollers. The rollers are driven by a fluid motor through a flexible chain and the separating unit in general is inclined downwardly to cause the crop material to move thereover by gravity. Flexible means are provided in the form of curtains to impede the passage of the crop and trash over the rollers thereby insuring good separation. The rearward porton of the rollers are formed as brushes so as to insure cleaniness of the crop before discharge from the separator.

4 Claims, 10 Drawing Figures

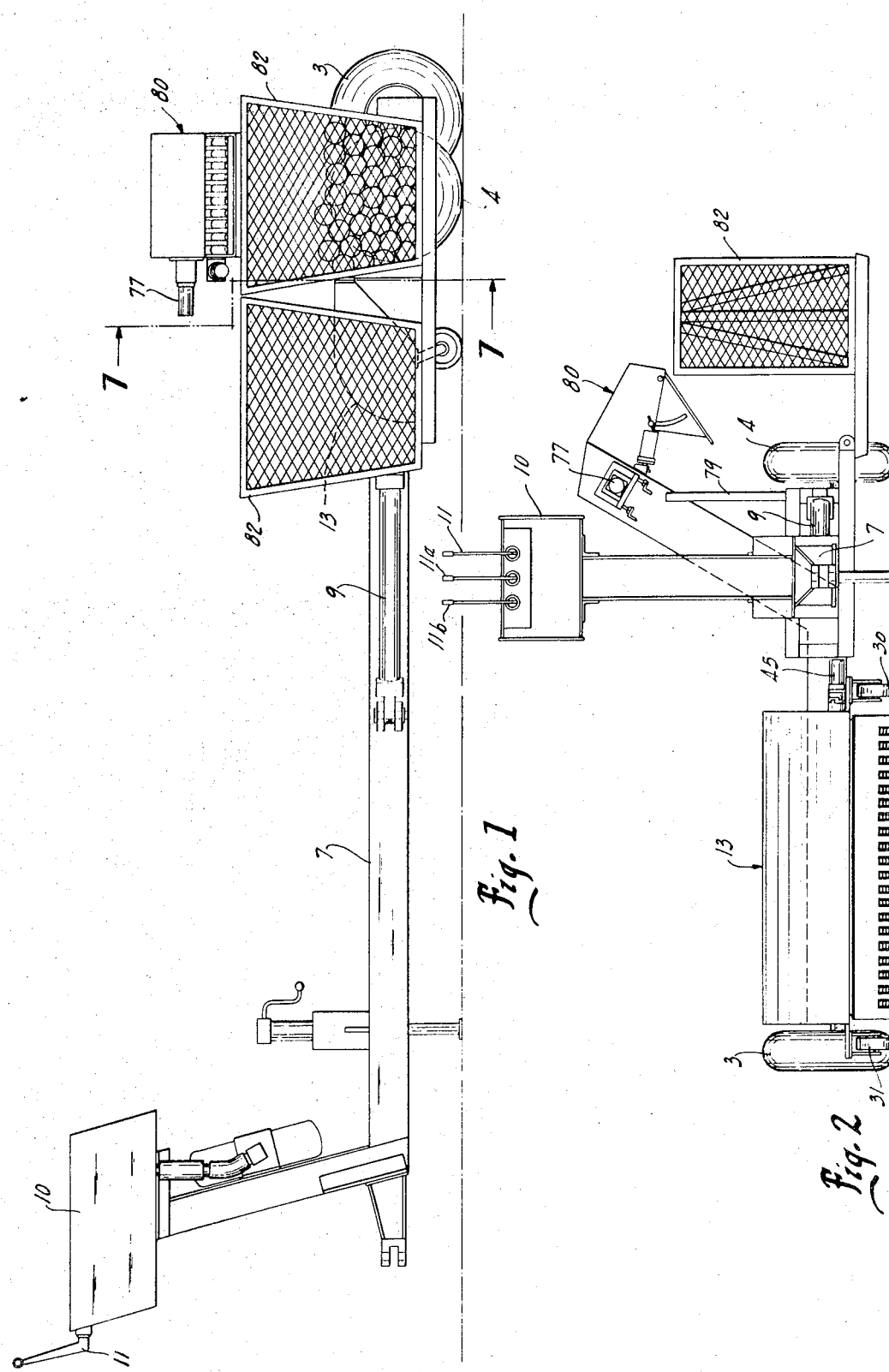

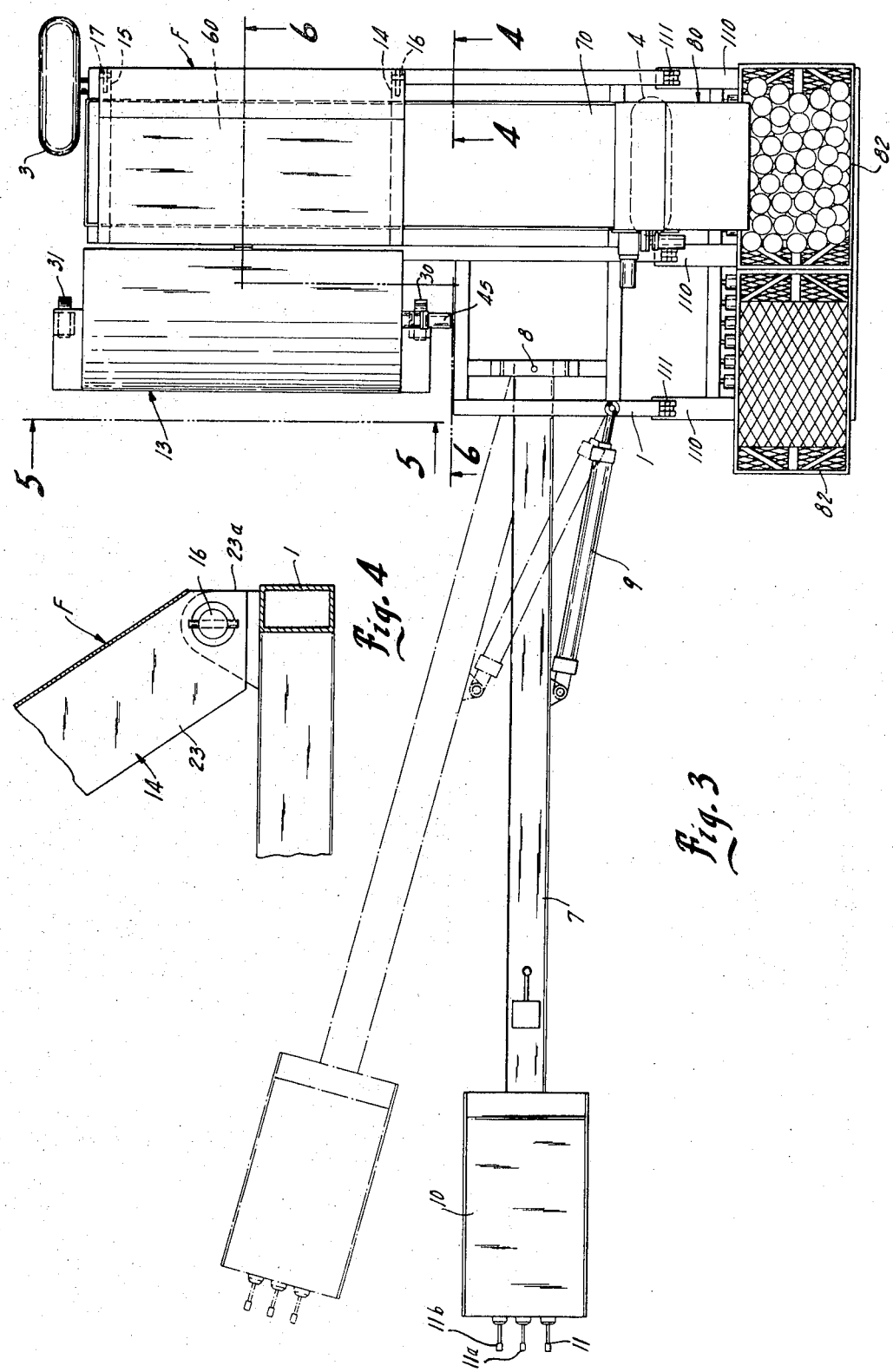

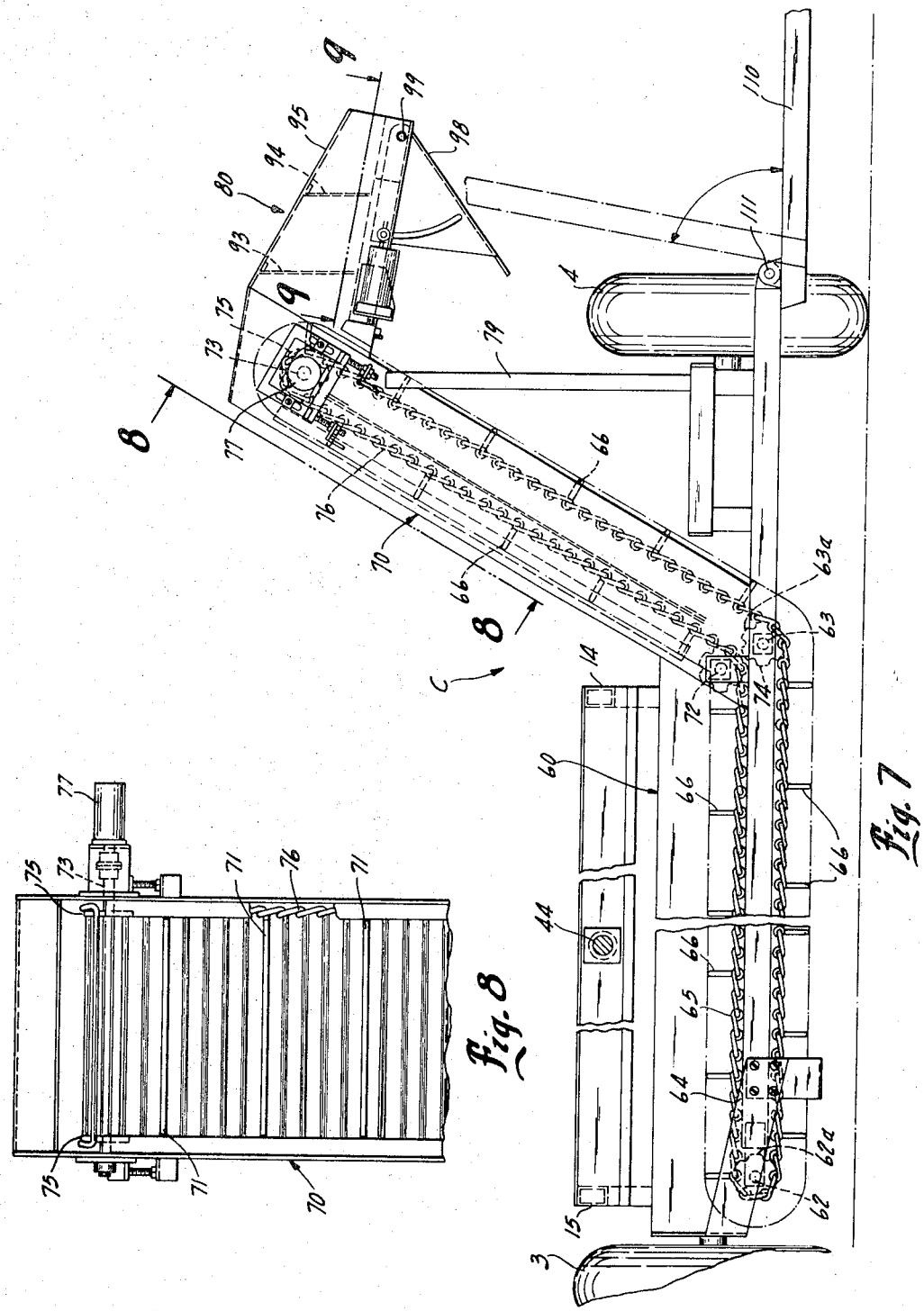

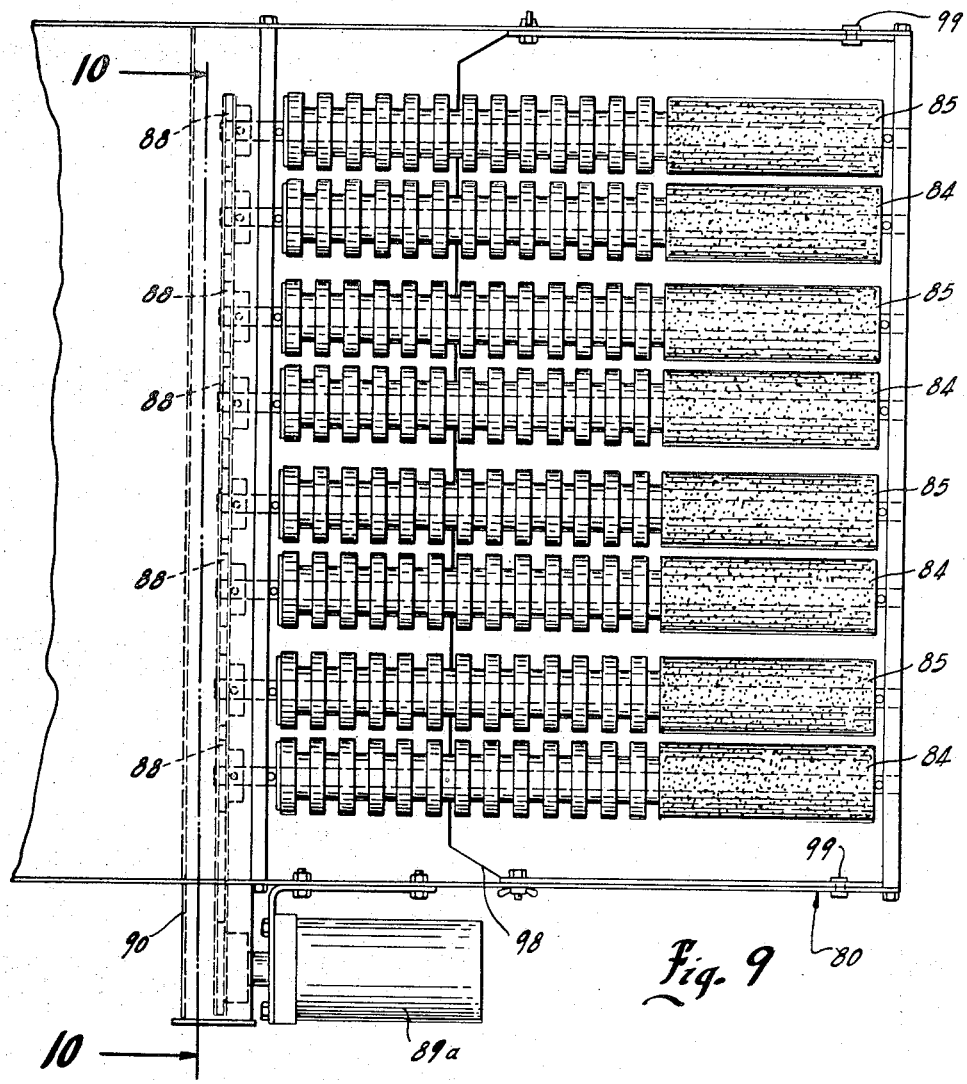
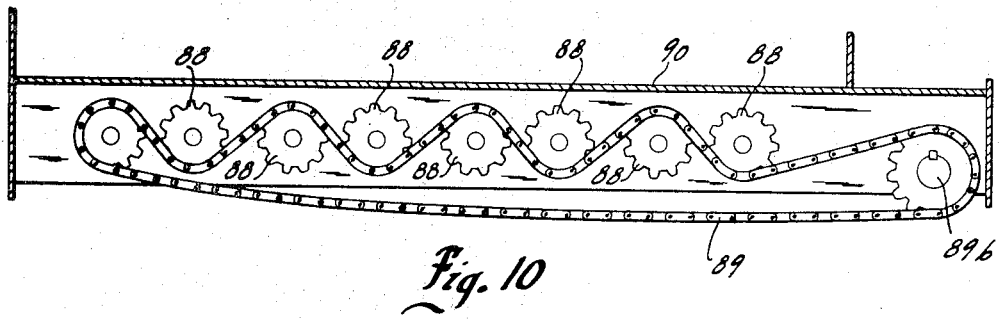

TRASH SEPARATOR FOR CROP PICK-UP HARVESTER

REFERENCE TO RELATED CO-PENDING APPLICATION

This is a divisional application of my copending U.S. Pat. application Ser. No. 172,623, filed Aug. 18, 1971 which issued as U.S. Pat. No. 3,712,039 on Jan. 23, 1973.

BACKGROUND OF THE INVENTION

The invention pertains to a trash separator for a mobile fruit harvester of the type that travels over the ground and picks up the fruit that lies loosely on the ground. In harvesting such crops, these harvesters pick up a considerable amount of trash and furthermore the fruit becomes dirty. Trash separators have been proposed for such harvesters, but in general did not prove to be entirely satisfactory because they were either too aggressive and thereby bruised the skin of the crop, or did not completely clean the crop due to the fact that the movement of the crop was not regulated over the separator or the separator failed to remove mud or other foreign matter from the surface of the crop.

SUMMARY OF THE INVENTION

The present invention relates to a trash separator for a mobile fruit harvester adapted to harvest fruit lying on the ground, and which separator acts to clean the crop before discharging it. A more specific aspect of the invention relates to means for regulating the speed of the crop over the downwardly inclined separator rolls. The separator rolls have their rearward portion formed as brushes so as to insure cleaning of mud or the like from the crop. Generally, the action of the separator is such that it gently yet positively handles the crop and thoroughly cleans it without damage.

These and other objects and advantages of the present invention will appear hereinafter as this disclosure progresses, reference being had to the accompanying drawings.

BRIEF DESCRIPTION OF THE DRAWINGS

FIG. 1 is a side elevational view of a harvester embodying the present invention;

FIG. 2 is a front elevational view of the harvester shown in FIG. 1;

FIG. 3 is a plan view of the harvester shown in FIG. 1;

FIG. 4 is an enlarged, detailed, sectional view taken generally about the line 4—4 in FIG. 3;

FIG. 7 is a transverse sectional view through the machine, the view being taken generally along the line 7—7 in FIG. 1, but on an enlarged scale;

FIG. 8 is a view taken along the line 8—8 in FIG. 7;

FIG. 9 is a plan view of the trash separator and taken generally along the line 9—9 in FIG. 7, but on an enlarged scale;

FIG. 10 is a sectional view taken along line 10—10 in FIG. 9.

DESCRIPTION OF A PREFERRED EMBODIMENT

Main Frame

Figure 5:
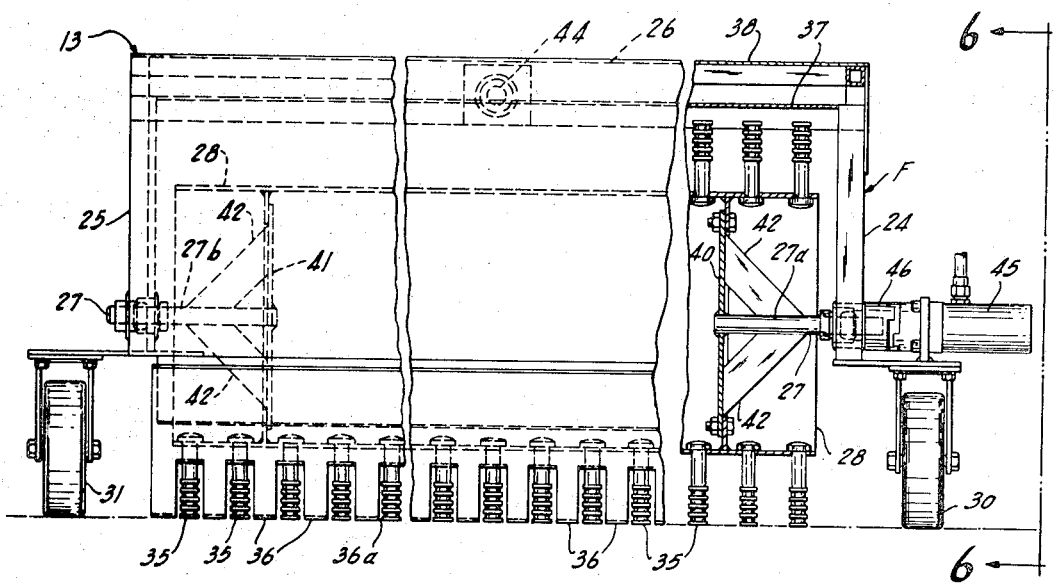
FIG. 5 is a front elevational view of the pick-up unit taken generally along the line 5—5 in FIG. 3, but on an enlarged scale and showing certain parts as being broken away, in section, or removed for the sake of clarity in the drawings.

The harvester provided by the present invention includes a main, generally horizontal frame 1 which is fabricated from a number of steel members welded or otherwise secured together, the main frame being supported for travel over the ground by a pair of laterally disposed ground wheels 3 and 4. A swingable drawbar 7 extends generally forwardly from the main frame and at one side therefrom and is pivoted to the main frame about a generally vertical pin 8 (FIG. 3). A hydraulic, double acting cylinder unit 9 is connected between the main frame and the draw bar so as to laterally adjust the draw bar in respect to the main frame thereby changing the trailing position of the harvester in respect to the pulling vehicle (not shown), such as a tractor or the like. An operator's control box 10 is located on the upwardly extending portion of the draw bar and the operator's levers 11, 11a, and 11b are provided, respectively for causing rotation of the pick-up drum, swinging of the drawbar, and operation of the conveyors, as will appear. The control box is connected by the various conduits to the various fluid motors of the harvester, as will also appear.

Crop Pick-Up Assembly

A crop pick-up assembly is provided for the harvester and includes a rotary pick-up device 13 mounted on a swingable frame F (FIGS, 4, 5 and 6) in such a manner as to be able to follow the contour of the ground, as follows.

Figure 6:
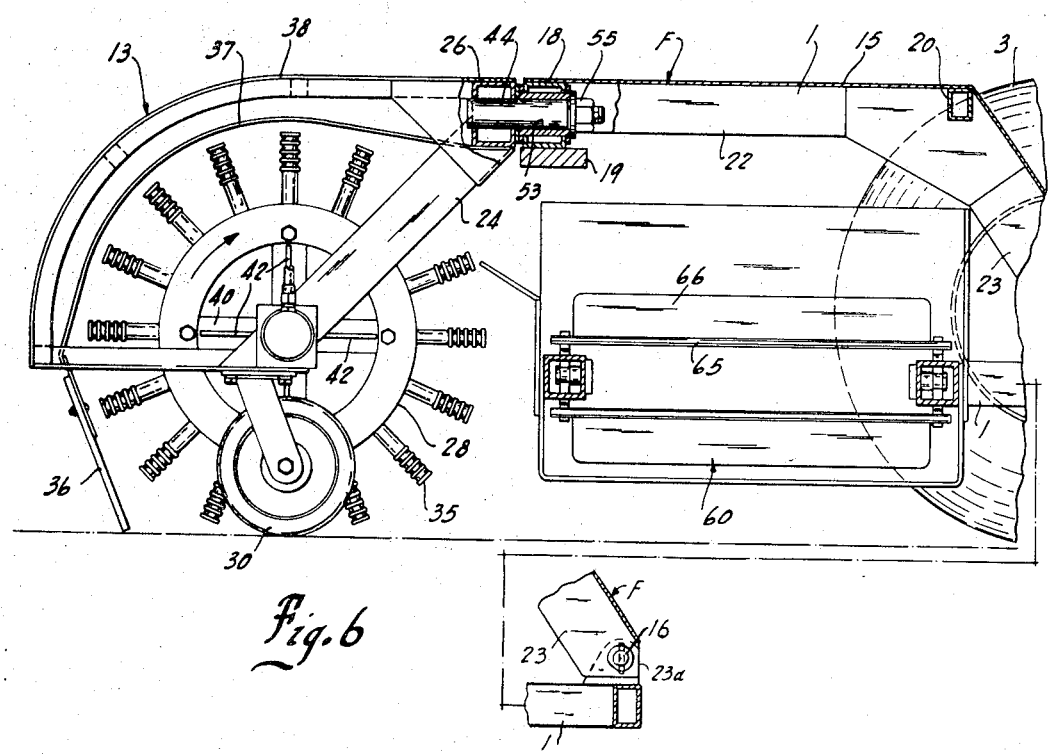
FIG. 6 is a view taken generally along the line 6—6 in FIG. 5, but showing certain parts as being broken away, in section, or removed for the sake of clarity in the drawings.

The rotary pick-up device 13 is mounted along the forward side of the main frame 1 on the generally vertical swingable frame F. The frame includes a pair of laterally spaced and generally fore and aft positioned arms 14 and 15 which are pivoted about a generally transverse, horizontal axis by means of pins 16 and 17 (FIGS. 3 and 4) to the main frame. More specifically, it will be noted that frame F includes a forward, generally vertically disposed and transverse tube 18 and brace 19 (FIG. 6). Another laterally extending brace 20 is rigidly secured intermediate the the arms. The frame also includes an intermediate portion 22 which extends rearwardly from the device 13, and also includes a rear, downwardly extending portion 23 having an end 23a which is pivoted to the main frame.

The rotary pick-up device 13 also includes a pair of laterally spaced, upwardly and rearwardly extending arms 24, 25, rigidly secured together at their rear end by a transversely positioned, tubular member 26. A generally cylindrical, rotatable drum 28 is journalled by shaft means 27 in the lower ends of the arms 24, 25 and a pair of ground engaging, skids or wheels 30 and 31 are rigidly attached to the lower ends of the arms so as to be able to follow the contour of the ground and maintain the drum at a predetermined distance above the ground being traversed. The cylindrical drum has a plurality of rubber sweeping fingers 35 extending radially therefrom, in transversely and circumferentially spaced relationship. These fingers are flexible and are adapted to sweep along the ground to contact the fruit to be picked up. It will be noted from the direction of the curvilinear arrows that the drum rotates in a direction so that its lower surface moves forwardly in respect to the direction of harvester travel.

A canvas flap 36 extends across the front end of the rotary pick-up unit 13 and has a series of recesses 36a (FIG. 5) cut therein along its length. The flap is adapted to engage the ground as the harvester moves thereover and the crop such as apples or oranges are engaged by the flap to cause the latter to flex rearwardly, thereby permitting passage of the crop into contact with the fingers which are generally moving forwardly and upwardly in that area.

The notches or recesses in the flexible flap permit entry of the crop into engagement with the fingers, but also prevents the entire flap from swinging rearwardly, due to the resistance of a heavy collection of the crop on the ground, which would interfere with the pick-up action of the fingers.

The action of the pick-up device is such that the crop is lifted gently but positively by the fingers and conveyed against the inner, arcuate cover 37 of the pick-up unit, thereby holding the crop captive between the fingers and the cover as the crop is lifted over the rotatable drum. The pick-up unit also includes an outer cover 38 for protecting the pick-up unit from branches of the trees or other obstacles.

The rotatable drum is of light-weight, yet rigid construction and the shaft means 27 comprises two stub shafts 27a and 27b (FIG. 5) which are connected to the cylindrical drum by means of the internal spiders 40 and 41, respectively. Gusset plates 42 act as braces between the spider and the two stub shafts and the rubber fingers are fastened and extend through the cylindrical drum.

The rotary pick-up drum is driven by a conventional fluid motor 45 which has a detachable coupling 46 with the end of one of the stub shafts 27a.

The rotary pick-up device 13 is mounted for swinging about a generally fore and aft, horizontal and centrally disposed pivot shaft 44 which extends through and is fixed to the tubular member 26 of the pick-up device. The shaft is journalled in an aperture 53 located in the central portion of the tube 18 of the frame F. A nut 55 threadably engages the end of the shaft 44 and holds the pick-up device captive on but detachable relative to the frame F.

With the above mounting for the pick-up device, it can closely follow the contour of the ground, that is to say the ends of the drum can rise and fall in opposite directions about the transversely central pivot shaft 44, and the pick-up device can also bodily rise and fall in a generally vertical direction about a rear and relatively low pivot axis formed by pins 16 and 17. In this manner, the rotary pick-up device is flexibly mounted and can maintain a constant attitude to the ground over which it traverses. Because the pivot axis of pins 16 and 17 is relatively low, pivoting of the drum thereabout will be strictly vertical with practically no horizontal component of movement. In this manner, interference with vertical drum movement, which might otherwise be particularly problemical upon traverse pivoting of the drum about the axis of the pivot shaft 44, is circumvented.

Conveyor

A generally transverse, paddle type endless conveyor C is rotatably mounted on the main frame and has a transverse portion 60 located directly behind the rotary pick-up device 13 for receiving the crop therefrom. More specifically, conveyor portion 60 is located under the frame F of the pick-up assembly and receives the crop as it is discharged rearwardly over the top of the pick-up drum. The conveyor C includes four, fore and aft arranged and transversely spaced shafts 62, 63, and 72, 73, each having a pair of sprockets 62a, 63a, 74 and 75 (FIG. 7), respectively, fixed to their ends. The conveyor also includes a pair of endless, flexible members 64 which are connected by the fore and aft arranged, parallel rods 65. A series of spaced apart paddles 66 are also connected between the pair of endless members so that the crop is conveyed on the rods 65 in a transverse direction with respect to the forward direction of harvester travel. The spaced apart rods 64 permit a certain amount of foreign material to pass therethrough as the conveyor travels in its endless path. The crop is conveyed transversely by the upper flight of the conveyor portion 60 and delivered to the upwardly inclined and transversely extending, elevating conveyor portion 70. Portion 70 serves as an elevating conveyor for delivering the crop upwardly to a trash separator, to be described.

Trash separator

A trash separator 80 is mounted adjacent the upper end of the conveyor portion 70, receives the crop therefrom and separates the trash, such as branches, leaves, paper or other foreign material from the crop before the crop is discharged from the separator into the storage boxes 82.

More specifically, the separator 80 includes four pairs of oppositely rotating rollers, the individual rollers 84, 85 of each pair rotating in a direction opposite one another to thereby pull the foreign material downwardly through the nip formed between the individual rollers of the pairs of rollers.

The rollers themselves are fabricated from rubber and are corrugated along a portion of their length, as shown in FIG. 9, to provide an aggressive pulling action of the foreign material, without damaging the crop.

It will be noted that the rollers each have a sprocket 88 at the forward end, which sprockets are all connected together by the drive chain 89. A fluid motor 89a is connected by its shaft 89b to the chain 89. A chain guard 90 extends over the sprockets and chain thereby preventing the crop from contact therewith as it falls from the elevator 70 onto the rollers.

The separating unit is inclined downwardly (FIG. 7) so as to cause the crop to move by gravity over the rollers. In order to insure that the crop and trash do not move too rapidly over the rollers, flexible means in the form of a pair of curtains 93 and 94 are attached to an upper housing 95 that extends over the rollers, and these flexible means act to impede the passage of the crop and trash over the rollers, thereby insuring good trash separation from the crop. The separating unit rollers may be horizontally oriented to reduce the speed of crop travel through the separator and also to permit positioning of taller boxes under the outboard end thereof. The angle of inclination of the separator and the length of the rollers may be varied.

The separator also acts to clean the crop as it moves over the discharge end thereof and this is accomplished by having the rearward portion of the rollers formed as brushes 96 which act to rub against the complete surface of the crop as the latter roll and tumble over the rollers, thereby insuring cleanliness of the crop before discharge into the boxes 82.

A trash shield 98 is pivotally mounted at 99 to the lower end of and beneath the separator, and is inclined so as to act to cause the trash to fall by gravity away from the crop discharge end of the separator and more particularly away from boxes 82.

The rollers are sufficiently flexible to permit the passage of branches, etc. downwardly between the rollers, are aggressive to positively separate the trash, and at the same time do not damage the drop passing over them.

Storage Means

The storage boxes 82 are carried by the platform 110 which is pivoted to the main frame at 111. The boxes can be easily placed on or removed from the platform, and when it is desired to transport the vehicle, the platform can be swung to an upper transport position.

Resume

The trash separating mechanism of the present invention insures that trash is removed from the crop as the crop passes over the rollers and the trash is discharged away from the storage box. On the other hand, the separator rollers are of such a nature that they handle the crop gently and the rollers also include brush portions which clean the crop before it is discharged therefrom.

I claim:

1. A trash separator for a harvester of a fruit material such as oranges, apples, or the like lying on the ground, said separator comprising, a plurality of pairs of counter-rotating rollers, the rollers of each pair rotating toward one another at their upper sides for pulling twigs, leaves or other foreign material downwardly between the rollers of said pairs while permitting the fruit material to move along the upper side of said rollers from a fruit material entry side of said separator to a crop discharge side of said separator, said rollers comprising rubber-like material and being generally serrated to permit passage of foreign material through the rollers of each pair and preventing damage to said fruit material passing thereover, said rollers also having a co-axial brush portion located at the discharge end of said separator for cleaning the fruit material passing thereover, and means for positively rotating said rollers.

2. The separator set forth in claim 1 wherein said means for positively driving said rollers includes a sprocket mounted on one end of each of said rollers, a flexible drive member trained around said rollers, and a fluid motor for driving said flexible member.

3. The separator set forth in claim 1 including an upper housing over said rollers, and flexible means suspended from said housing and lying adjacent the upper surfaces of said rollers and impeding the movement of the crop thereover.

4. The separator set forth in claim 2 including a trash deflecting shield pivotally attached at one end beneath said rollers and being inclined so as to deflect the trash material away from the discharge end of said separator.

* * * * *